(12) United States Patent
Stolen

(10) Patent No.: US 6,437,822 B1
(45) Date of Patent: Aug. 20, 2002

(54) METHOD AND APPARATUS FOR GENERATING AN HDTV SIGNAL FOR USE IN DEMONSTRATING AN HDTV RECEIVER

(75) Inventor: Michael I. Stolen, Sioux Falls, SD (US)

(73) Assignee: Sencore, Inc., Sioux Falls, SD (US)

( * ) Notice: Subject to any disclaimer, the term of this patent is extended or adjusted under 35 U.S.C. 154(b) by 0 days.

(21) Appl. No.: 09/538,834

(22) Filed: Mar. 30, 2000

(51) Int. Cl.[7] .......................... H04N 17/00; H04N 5/40
(52) U.S. Cl. ..................... 348/181; 348/189; 348/724
(58) Field of Search ........................... 348/181, 180, 348/189, 723, 724; H04N 17/00, 5/38, 5/40

(56) References Cited

U.S. PATENT DOCUMENTS 4,564,858 A * 1/1986 Resch .................... 348/723
6,185,255 B1 * 2/2001 Twitchell et al. .......... 348/723

* cited by examiner

*Primary Examiner*—Sherrie Hsia
(74) *Attorney, Agent, or Firm*—Patnaude & Videbeck

(57) ABSTRACT

A method and apparatus are disclosed for generating an 8-level vestigial side band modulated radio frequency signal as a high definition television test signal. The invention utilizes the above in connection with a single ISA bus computer board that may be utilized in a personal computer for generating signals used to demonstrate HDTV products without the need for over the air HDTV broadcast signals.

6 Claims, 1 Drawing Sheet

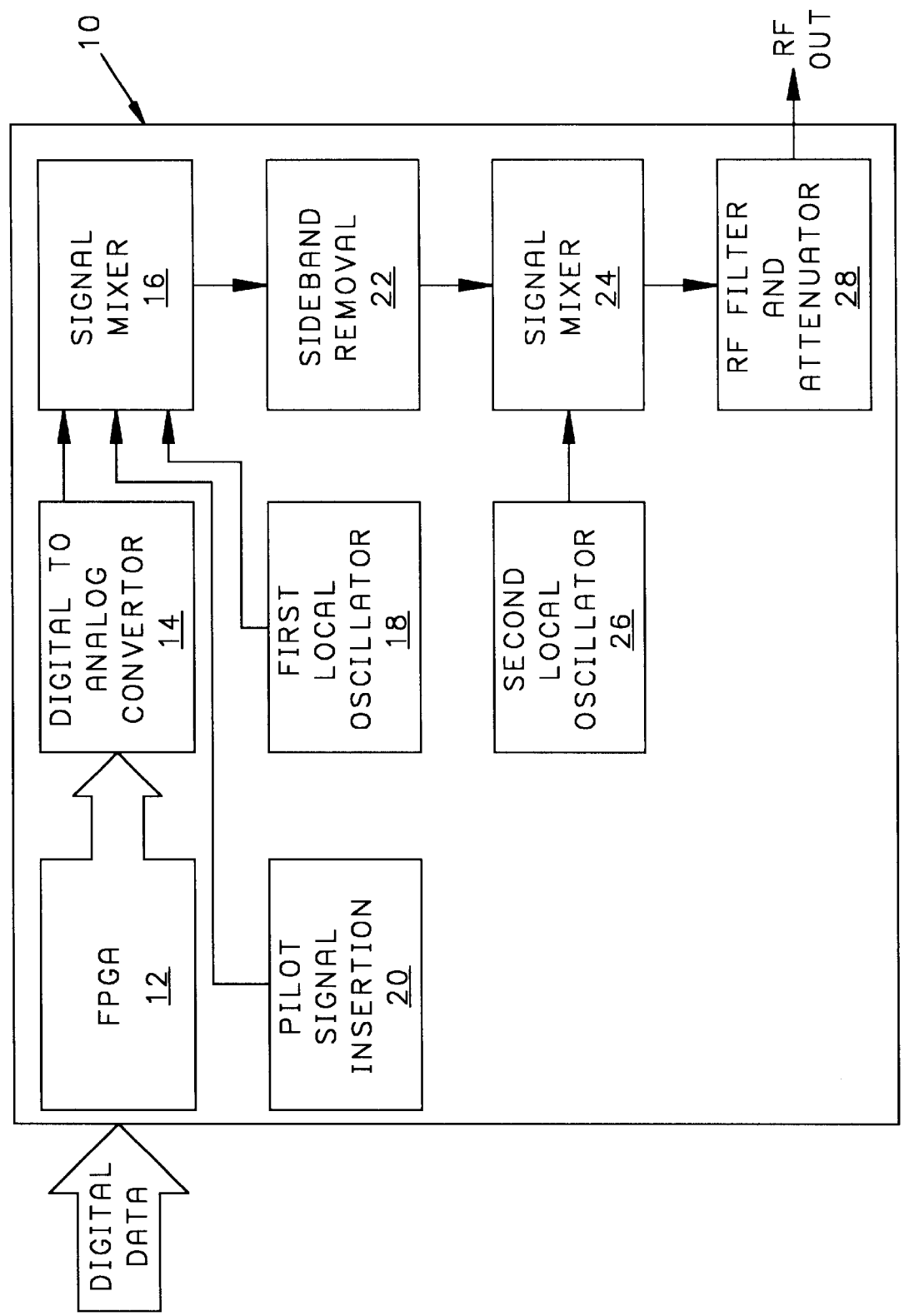

METHOD AND APPARATUS FOR GENERATING AN HDTV SIGNAL FOR USE IN DEMONSTRATING AN HDTV RECEIVER

The present invention relates generally to the art of producing an 8-level Vestigial Side Band modulated radio frequency signal, and it relates more particularly to a new and improved method and apparatus for generating an HDTV test signal using a single ISA bus computer board for use in demonstrating HDTV products without the need for over-the-air HDTV broadcast signals.

BACKGROUND OF THE INVENTION

At the present time, broadcast television operates under a standard defined by the National Television Standards Committee. Over the next few years this standard will be phased out and replaced by a new digital television standard defined by the Advance Television Standards Committee for High Definition Television. High Definition Television, HDTV, is synonymous with the standard of the Advance Television Standards Committee, ATSC.

HDTV digital video data is compressed and encoded using the MPEG-II format into a data stream known as the DTV transport layer. The ATSC standard for transmission uses an RF modulation format called 8-VSB, 8 level Vestigial Side Band, as the means to convey the DTV transport layer from a television transmitter to one or more television receivers. Use of the 8-VSB format makes it possible to fit the 19.39 Megabit/second data rate of the DTV transport layer into an RF channel with a bandwidth of only 6 MHz.

Devices used at the present time to generate an 8-VSB modulated RF signal are usually intended for use in a television broadcast application, and are relatively expensive and contained in large enclosures often intended for mounting in a 19 inch equipment rack. Usually, two separate pieces of equipment are required, one being an 8-VSB modulator for converting the HDTV data stream to an 8-VSB intermediate frequency signal, and the other, called an RF modulator, for converting the IF signal to an RF signal. A typical RF modulator is capable of generating an RF signal on any of several broadcast or cable television channels.

During the transition period between the current NTSC television broadcast standard and the new ATSC television broadcast standard very few live HDTV signals are being transmitted, wherefore a need exists in the industry for a compact, inexpensive device to allow manufacturers and retailers of HDTV products to demonstrate HDTV to the general public.

SUMMARY OF THE INVENTION

Briefly, there is provided in accordance with the present invention a new and improved method and apparatus a device which combines the functions of an 8-VSB modulator and an RF modulator and is totally contained on a single ISA computer board that plugs into an ISA computer slot eliminating the need for a separate enclosure and dedicated power supply for each modulator, thereby reducing the space required and the cost thereof. Moreover, since only one channel is required for demonstrating HDTV, this invention further reduces the cost of the necessary circuitry to generate all broadcast and cable television channels.

BRIEF DESCRIPTION OF THE DRAWING

The present invention may be better understood by a reading of the following detailed description taken in connection with the accompanying drawing wherein:

The single FIGURE is a schematic circuit diagram of a preferred embodiment of a device embodying the present invention.

DETAILED DESCRIPTION OF THE INVENTION

Referring to the single FIGURE of the drawing, a single ISA computer board 10 is shown schematically and contains all of the circuitry necessary to produce an HDTV signal for use in demonstrating digital television equipment, such, for example, as television receivers. In order to use this HDTV generator, it is only necessary to insert this single board 10 into the appropriate slot in a computer and apply an input data signal to output the HDTV RF signal from the ISA board to the input of the device to be demonstrated.

As illustrated in the drawing, an input data signal, which may contain information suitable for demonstrating an HDTV device is applied to a field programmable gate array 12, commonly called an FPGA, mounted on the ISA board. The FPGA performs a number of processing functions on the input data signal including data synchronization, data randomization, Reed-Solomon encoding, data interleaving, trellis encoding, sync signal insertion, AM modulation, and Nyquist filtering, all such processes being well known in the HDTV art. The thus processed data stream is applied to a digital to analog converter 14 which applies the digital data signal developed therein to a signal mixer 16 which is also supplied with a signal from a first local IF oscillator 18. The data and IF carrier signals are mixed to produce a data modulated intermediate carrier signal. In addition to the IF carrier, a pilot signal is applied to the mixer from a pilot signal insertion circuit 20 and modulated onto the IF carrier. As is well known in the art, the pilot signal is used by an HDTV receiver to frequency and phase lock a local oscillator in the receiver which is used to down convert the data signal to baseband.

The data and pilot modulated IF signal from the mixer is applied to a sideband removal circuit 22 which removes all but one of the side bands produced by the mixer and applies the resulting IF signal to a second signal mixer 24 where it is modulated onto a radio frequency carrier wave from a second local oscillator 26 which produces a fixed frequency RF output signal. The particular radio frequency is chosen to be that of any desired television channel such, for example, as a channel not being used by local TV broadcasters or other locally received television channels.

The IF modulated RF carrier is then applied to an RF filter and attenuator 28 which removes all but one of the RF sidebands and supplies the resulting IF modulated RF signal to the output terminal of the ISA board from which it is connected by coaxial cable to the input of the HDTV device to be demonstrated. When that device is tuned to the channel corresponding to the frequency of the RF output signal, the HDTV signal appears on the screen of the device to be demonstrated.

It may thus be seen that both the 8-VSB modulator and the RF modulator and their accompanying circuits are contained on a single ISA board thereby eliminating the need for a separate enclosure and the space needed therefor in prior art devices. Moreover, a substantial cost savings is realized by combining the functions of the 8-VSB modulator and the RF modulator on a single board while enabling the use of simple IF and RF oscillators which operate at respectively fixed frequency. Consequently, only one channel is required for generating all broadcast and cable channels for HDTV demonstration.

While the present invention has been described in connection with a preferred embodiment thereof, it will be understood that many changes and modifications may be made without departing from the present invention. Therefore, it is intended by the appended claims to cover all such changes and modifications which come within the scope of the invention.

What is claimed is:

1. A method of producing an HDTV signal of use in demonstrating the operation of an HDTV device, comprising the steps of, mounting a means for producing an 8-level Vestigial Side Band IF signal on an ISA board, mounting a radio frequency oscillator on said board, and mounting on said board a mixer for modulating a radio frequency carrier from said oscillator with said 8-level Vestigial Side Band IF signal.

2. The method according to claim 1, further comprising the step of, mounting a pilot signal insertion device on said board, and connecting the pilot signal from said pilot signal insertion device to said means for producing an 8-level Vestigial Side Band IF signal.

3. The method according to claim 1, wherein said step of mounting a means for producing an 8-level Vestigial Side Band IF signal on an ISA board includes the step of mounting an IF oscillator on said board.

4. Apparatus for producing an HDTV signal suitable for demonstrating the operation of an HDTV device, comprising, an ISA board, means mounted on said board for producing an 8-level Vestigial Side Band IF signal, means for mounting a radio frequency oscillator on said board, and mixer means mounted on said board for modulating a radio frequency carrier from said radio frequency oscillator with said 8-level Vestigial Side Band IF signal.

5. Apparatus according to claim 4, further comprising means for producing pilot insertion signal, and means for connecting said pilot insertion signal to said means for producing an 8-level Vestigial Side Band IF signal.

6. Apparatus according to claim 5, wherein said means for producing an 8-level Vestigial Side Band IF signal comprises, an intermediate frequency oscillator mounted on said board.

\* \* \* \* \*